(12) United States Patent
Krupp (10) Patent No.: US 12,260,990 B2
(45) Date of Patent: Mar. 25, 2025

(54) BATTERY-ULTRACAPACITOR STUD WELDER

(71) Applicant: Autab, LLC, Vermilion, OH (US)

(72) Inventor: Jeffrey Krupp, Vermilion, OH (US)

(73) Assignee: Autab, LLC, Vermillion, OH (US)

( * ) Notice: Subject to any disclaimer, the term of this patent is extended or adjusted under 35 U.S.C. 154(b) by 916 days.

(21) Appl. No.: 17/204,632

(22) Filed: Mar. 17, 2021

(65) Prior Publication Data

US 2021/0296057 A1   Sep. 23, 2021

Related U.S. Application Data

(60) Provisional application No. 62/993,330, filed on Mar. 23, 2020.

(51) Int. Cl.
   *H01G 11/50*   (2013.01)
   *B23K 9/10*    (2006.01)
   *B23K 9/20*    (2006.01)
   *H01M 10/0525* (2010.01)

(52) U.S. Cl.
   CPC .......... *H01G 11/50* (2013.01); *B23K 9/1043* (2013.01); *B23K 9/202* (2013.01); *H01M 10/0525* (2013.01)

(58) Field of Classification Search
   CPC ...... H01G 11/50; H01G 11/08; B23K 9/1043; B23K 9/202; B23K 9/1006; B23K 9/201; B23K 9/10; B23K 9/20; H01M 10/0525; Y02E 60/10; Y02E 60/13; H01S 2301/176; H01S 5/02345; H01S 5/04254; H01S 5/183; H01S 5/18311; H01S 5/18394; H01S 5/426; H01S 5/022; H01S 5/042; H01S 5/42

See application file for complete search history.

(56) References Cited

U.S. PATENT DOCUMENTS

| | | | | |
|---|---|---|---|---|
| 9,925,613 B2* | 3/2018 | Rozmarynowski | .. | B23K 9/1043 |
| 10,099,308 B2* | 10/2018 | Vogel | ................... | B23K 9/1081 |
| 10,166,624 B2* | 1/2019 | Furman | ................ | B23K 9/1081 |
| 2006/0037953 A1* | 2/2006 | Matthews | ............ | B23K 9/1006 |
| | | | | 219/133 |
| 2014/0263245 A1* | 9/2014 | Ulrich | .................. | B23K 9/1075 |
| | | | | 219/133 |
| 2017/0050257 A1* | 2/2017 | Leiteritz | ................ | B23K 9/173 |
| 2018/0191183 A1* | 7/2018 | Namiki | .............. | H05K 7/20145 |

(Continued)

OTHER PUBLICATIONS

Equivalent Series Resistance, Wikipedia, p. 2.*

(Continued)

*Primary Examiner* — Dana Ross
*Assistant Examiner* — Adam M Eckardt
(74) *Attorney, Agent, or Firm* — Lippes Mathias LLP (57) ABSTRACT

Devices and systems are disclosed herein for drawn arc stud welding. These systems and devices are extremely portable (<50 lbs.), deliver enough power for up to ¾" diameter studs, and include a charging circuit, an energy storage device comprising a plurality of low ESR ultracapacitors, and a discharge circuit. The systems and devices can include a lithium nickel manganese cobalt oxide ($LiNiMnCoO_2$) battery to supply the energy storage device with about 20 to about 30 amps of current between welding operations.

14 Claims, 10 Drawing Sheets

(56) References Cited

U.S. PATENT DOCUMENTS

2018/0264581 A1* 9/2018 Schraff .................. B23K 9/205
2018/0372054 A1* 12/2018 Chen ................. H01M 10/4264

OTHER PUBLICATIONS

Equivalent Series Resistance, Wikipedia, p. 2 (Year: 2007).*
Barbenhenn, George. Supercapacitor Charger and Ideal Diode for Power Supply Ride-Through Systems. Journal of Analog Innovation. Jan. 2012. (Year: 2012).*
Beck, Anton. Lithium Iron Phosphate vs. Lithium-Ion: Differences and Advantages. epec. Sep. 20, 2019. (Year: 2019).*

* cited by examiner

BATTERY-ULTRACAPACITOR STUD WELDER

BACKGROUND

The present invention generally relates to systems and devices used for stud welding, and more particularly to battery-powered, portable stud welding systems and devices, such as drawn arc welding tools.

Stud welding is a technique for welding a fastener, such as a stud or other fastener, to a parent metal of a workpiece. Various stud welding systems are known in the art for this purpose. One such type of stud welding system is known as a capacitive discharge ("CD") system, which typically includes a charging circuit, an energy storage device, and a discharge circuit which extends through a weld stud gun. The power supply for such welding systems is normally an external source of AC power. In operation, the energy storage device is discharged to create an arc between a stud that is connected to the weld stud gun and the workpiece, thereby heating up the stud and the workpiece. When the arc is complete, the weld stud gun plunges the stud into the heated area on the workpiece to create a weldment. However, these stud welder systems must be tethered to an external power supply (i.e., AC power), during operation and, therefore, are not portable. Further, the capacitive discharge process that these systems use is recognized in the art and by key regulatory codes such as the American Welding Society ("AWS") D1.1, as being unsuitable for full strength welds required in structural applications.

To produce full-strength welds suitable for structural applications, it is known in the art and required by AWS D1.1 welding code to apply a drawn arc stud welding system. A drawn arc stud welding system may include a high capacity electrical power converter, which may use a single phase or three phase industrial AC power supply as an input and may produce a high current DC welding output. For a drawn arc system capable of welding a stud of 19 mm (0.75 inches) diameter, this DC welding output current should be between 1500 and 1700 amps, for a duration of 700 to 900 milliseconds.

Drawn arc stud welding systems may be battery powered to achieve true portability, not needing to be connected to an input power cable, and being small and lightweight for easy transport. For these portable, battery-powered systems, the challenge for an optimally applied battery is to repeatedly provide the required high weld currents and a suitably high weld voltage, while being as small and as light as possible.

Drawn arc stud welding systems including a battery should be able to produce stud welds at a rate that meets the expectations of experienced welders. This requirement leads to the need for the battery of the drawn arc stud welding system to have excellent thermal management capability and to avoid overheating. The battery needs to be intrinsically safe from commonly understood hazards, including exothermic runaway events caused by overheating during use, or impacts/punctures that may cause internal short circuits leading to overcurrent/overheating of the internal structure of the battery.

Some existing portable, battery-powered drawn arc stud welding systems rely on several types of batteries, each of which has its own application tradeoffs. For example, an existing portable battery-powered drawn arc stud welding system may use multiple lead-acid batteries, resulting in a relatively large and heavy portable welding system. The use of multiple lead-acid batteries, which have a relatively low specific energy, results in a portable welding system that is difficult to transport and therefore has limitations on its applicability. As lead-acid batteries may require a relatively long recharge period, such a system may suffer from extended periods of lost operational time due to this limitation. Additional limitations include battery degradation due to excessive heat, battery aging, excessive discharge, slow rate of charge, short cycle life, and possible hazardous conditions due to the leakage of acid and/or hydrogen gas.

Other battery types for portable battery-powered drawn arc stud welding systems have negative attributes that limit their applicability in portable battery-powered drawn arc stud welding systems. Nickel cadmium (NiCd) batteries may lose their charge rapidly when not in use. NiCd batteries may also need to be completely discharged/charged to prevent an effect known as the memory effect, wherein NiCd batteries gradually lose their maximum charge capacity if not fully discharged before recharging. This effect only increases over time. Finally, NiCd batteries contain toxic cadmium, which creates additional hazards for environmentally appropriate disposal.

Nickel metal hydride (NiMH) batteries may lose their charge even more than NiCd batteries when not in use. NiMH batteries also have a shorter life cycle (total number of charge/discharge cycles) when compared with NiCd batteries. Finally, NiMH batteries require double the recharging time of NiCd batteries.

Other lithium ion battery chemistries, including $LiFePO_4$ may be used to take energy directly from the battery (i.e., no additional storage device), which has a limited current range and are less portable (i.e., weighing >60 lbs for maximum ½" weld base capability).

Other energy storage stud welding devices store very little energy (e.g., about 7.5 kJ of energy) at a much higher (>200 VDC) bus voltage, which creates additional hazards for the operator.

Accordingly, there is a need in the art for a drawn arc stud welding system that provides improved portability (i.e., lower weight), and more functionality (e.g., more power to weld bigger studs).

BRIEF DESCRIPTION

In accordance with one embodiment of this disclosure, described is a drawn arc fastener welding system comprising: a charging circuit; an energy storage device; and a discharge circuit. The charging circuit may be operatively connected to an external power supply and configured to generate a charging current. The energy storage device may be operatively connected to the charging circuit and be configured to (i) receive a charging current; and (ii) store a first amount(s) of energy for supporting at least one drawn arc stud welding operation; The discharge circuit may be operatively connected to the energy storage device and be configured to (i) receive an output current from the energy storage device; and (ii) communicate a discharge current to a drawn arc stud welding tool for a first time duration. In particular embodiments, the system may further comprise at least one of (i) the drawn arc stud welding tool; and (ii) the external power supply.

In further embodiments, the system may comprise a control system including: (i) at least one processor; (ii) a memory; and (iii) a user interface. The control system may be operatively connected to one or more of: the external power supply; the charging circuit; the energy storage device; the discharge circuit; and the drawn arc stud welding tool. The memory can be configured to store instructions to be executed by the at least one processor, and the user interface can be configured to enable multiple user-selectable modes of operation for the drawn arc fastener welding system.

In accordance with a second embodiment of this disclosure, described is a drawn arc stud welding system comprising: (i) a charging circuit; (ii) an energy storage device; (iii) a discharge circuit; (iv) a pilot arc circuit; (v) a constant current supply circuit; and (vi) an internal discharge circuit. The charging circuit can be operatively connected to an external power supply and configured to generate a charging current. The energy storage device can be operatively connected to the charging circuit and configured to (i) receive a charging current; and (ii) store a first amount(s) of energy for supporting at least one drawn arc stud welding operation. The discharge circuit can be operatively connected to the energy storage device and configured to: (i) receive an output current from the energy storage device; and (ii) communicate a discharge current to a drawn arc stud welding tool for a first time duration. The first time duration may be between about 5 ms to about 1500 ms, and will vary depend on the size of the stud to be welded. For example, the typical duration for a ¼" diameter stud is about 250 ms, 550 ms for a ½" diameter stud, and 900 ms for a ¾" diameter stud.

The pilot arc circuit may be operatively connected to the charging circuit and configured to deliver an initial current to the drawn arc stud welding tool to support a pilot arc. The constant current supply circuit can be operatively connected to the energy storage device and configured to drive a weld tool solenoid. Finally, the internal discharge circuit may be operatively connected to the energy storage device and configured to reduce the energy stored in the energy storage device to near zero for the purpose of servicing the machine.

In some embodiments, the drawn arc fastener welding system can further comprise a cooling apparatus operatively connected to the control system and/or one or more temperature sensors associated with the charging circuit and operatively connected to the control system.

In further embodiments, the memory of the control system includes instructions for: (i) receiving at least one temperature measurement from the one or more temperature sensors associated with the charging circuit; and (ii) adjusting the performance of the cooling apparatus based on the at least one temperature measurement received from the one or more temperature sensors associated with the charging circuit, wherein adjusting the performance of the cooling apparatus causes the charging circuit to change temperature.

In still further embodiments, the external power supply has a voltage of about 52V and provides a current of between about 20 amps to about 30 amps.

In some embodiments, the energy storage device stores at least about 100 KJ of energy or at least about 200 kJ of energy.

BRIEF DESCRIPTION OF THE DRAWINGS

The particular aspects and features discussed in the present disclosure can be varied and are referenced merely to illustrate one or more embodiments and are not intended to limit the scope thereof.

DETAILED DESCRIPTION

Various methods, apparatuses, devices, and systems are described herein which relate to drawn arc fastener welding. More specifically, the embodiments described herein relate to portable drawn arc fastener welding systems. The apparatuses, devices, and systems disclosed herein can deliver full strength stud welds for structural applications and have a form factor that allows a single user/operator to easily use and move.

Energy storage based, drawn arc stud welders have historically been powered from AC power outlets, typically 120 VAC/60 Hz in the United States, or 220 VAC/50 Hz in Europe. Because energy storage based, drawn-arc welders require substantial charging current to charge the capacitor bank rapidly between welds, traditional welders typically require 10-20 amp capacity from a 120 VAC line, or 5-10 amp capacity from a 220 VAC line. This requirement is generally met by having a high capacity line cord for power, usually a 16 AWG to 14 AWG, 3-conductor cord. This cord, when extended to allow the welding tool to be used at a distance from the power outlet, adds substantial weight, restricted movement, safety concerns (shock/tripping/arc flash) and limited portability. The portable systems described herein eliminates the need for the line cord, while also preserving the benefit of being very light weight. Additionally, the energy storage devices of the present disclosure allow the devices and systems to display significantly improve capabilities over those devices and systems of the prior art. In particular, the energy density is significantly higher (i.e., about 40× that of traditional capacitors).

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)", "having," "has," "can," "contain(s)," and variants thereof as used herein, are intended to be open-ended transitional phrases, terms, or words that require the presence of the named components and permit the presence of others.

Numerical values in the specification and claims of this application should be understood to include numerical values which are the same when reduced to the same number of significant figures and numerical values which differ from the stated value by less than the experimental error of conventional measurement techniques.

All ranges disclosed herein are inclusive of the recited endpoint and independently combinable (for example, the range "from 2 to 10" is inclusive of the endpoints, 2 and 10, and all the intermediate values).

The term "about" can be used to include any numerical value that can vary without changing the basic function of that value. When used with a range, "about" also discloses the range defined by the absolute values of the two endpoints, e.g., "about 2 to about 4" also discloses the range "from 2 to 4". The term "about" may refer to plus or minus 10% of the indicated number.

As used herein, the term "drawn arc stud welding operation" refers to and means the process of welding a single stud fastener to a parent metal using a drawn arc welding process, which generally includes the steps of energizing a pilot arc current, lifting the weld stud off a workpiece and drawing the pilot arc, energizing a weld using a welding current for a specified amount of time, and plunging the weld stud into the workpiece.

As used herein, the terms "operatively connected" and "electrically connected" refer to and mean a component is connected to another component in such a manner so as to facilitate the transmission of electrical signals and/or electrical current.

Figure 1:
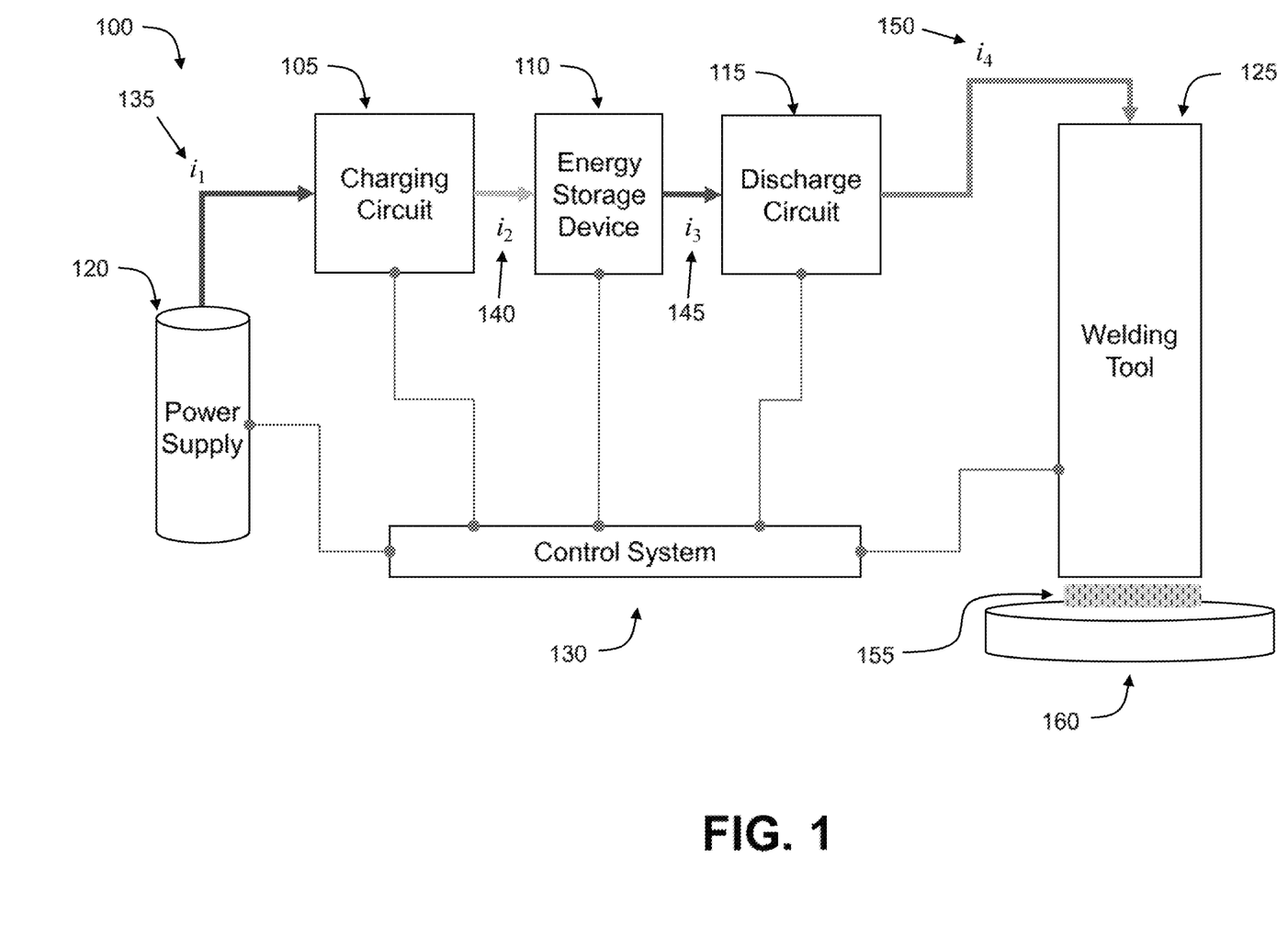
FIG. 1 is a block diagram of a drawn arc welding device illustrated in accordance with one aspect of the present disclosure.

Referring now to the drawings, FIG. 1 illustrates a block diagram of a drawn arc fastener welding system 100 in accordance with one aspect of the present disclosure. The system includes at least a charging circuit 105, an energy storage device 110, and a discharge circuit 115. In further embodiments, the system 100 can also include an external power supply 120, a drawn arc stud welding tool 125, and/or a control system 130.

The charging circuit 105 can be operatively (e.g., electrically) connected to the energy storage device 110 and an external power supply 120. The energy storage device 110 can be operatively (e.g., electrically) connected to the charging circuit 105 and the discharge circuit 115. The discharge circuit can be operatively (e.g., electrically) connected to the energy storage device 110 and the welding tool 125. In particular embodiments, the control system 130 is operatively connected to one or more of: the charging circuit 105; the energy storage device 110; the discharge circuit 115; the power supply 120; and/or the welding tool 125.

The external power supply 120 can supply power to the system 100 by, for example, supplying a current $i_1$ 135 to at least the charging circuit 105. The charging circuit 105 may be configured to receive the current $i_1$ 135 and generate a charging circuit $i_2$ 140, which is communicated to the energy storage device 110. In other words, the charging circuit 105 regulates the charging of the energy storage device 110 by generating and providing a controlled current $i_2$ 140 to the energy storage device 110.

The energy storage device 110 can be configured to receive the charging current $i_2$ 140 and store at least a first amount of energy. The energy stored by the energy storage device 110 can be used to support one or more drawn arc stud welding operations, including a plurality of drawn arc stud welding operations.

The discharge circuit 115 can be configured to receive an output current $i_3$ 145 from the energy storage device 110 and generate a discharge current $i_4$ 150. When operatively connected to a welding tool 125, such as a stud fastener welding tool, the discharge circuit 115 communicates/delivers the discharge current $i_4$ 150 to the welding tool 125 for a first time duration. That is, the discharge circuit 115 delivers a discharge current $i_4$ 150 to the welding tool 125 for the requisite amount of time in order to: (i) generate an arc 155 between the fastener (not shown) and the parent metal 160; and (ii) complete a welding operation.

As mentioned above, the system 100 can include a control system 130 operatively connected to one or more of: the charging circuit 105; the energy storage device 110; the discharge circuit 115; the power supply 120; and/or the welding tool 125.

In particular embodiments, the control system 130 includes at least one processor; a memory configured to store instructions to be executed by the at least one processor; and a user interface configured to enable multiple user-selectable modes of operation for the drawn arc fastener welding system 100. For example, the control system 130 may be configured to: (i) monitor voltages in the energy storage device 110; (ii) protect the energy storage device 110 from overvoltage by controlling the charging circuit 105; (iii) control and coordinate all power supplies as the welding operation requires; (iv) monitor temperature within the charging circuit 105; and/or (v) monitor the health of the external power supply 120.

The memory of the control system 130 may represent any type of non-transitory computer readable medium such as random access memory (RAM), read only memory (ROM), magnetic disk or tape, optical disk, flash memory, or holographic memory. In one embodiment, the memory comprises a combination of random access memory and read only memory. In some embodiments, the processor and memory may be combined in a single chip. The memory of the control system 130 stores instructions for performing at least the steps described above, as well as the processed data, as necessary, such as any user-defined settings.

The digital processor of the control system 130 can be variously embodied, such as by a single-core processor, a dual-core processor (or more generally by a multiple-core processor), a digital processor and cooperating math coprocessor, a digital controller, or the like.

The term "instructions" as used herein is intended to encompass any collection or set of instructions executable by a computer or other digital system so as to configure the computer or other digital system to perform the task that is the intent of the software. Such instructions can be stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The software instructions of the control system 130 may include various components for implementing parts of the method. For example, the instructions of the control system 130 include components configured to: (i) monitor voltages in the energy storage device 110; (ii) protect the energy storage device 110 from overvoltage by controlling the charging circuit 105; (iii) control and coordinate all power supplies as the welding operation requires; (iv) monitor temperature within the charging circuit 105; (v) monitor the health of the external power supply 120; and/or (vi) control a variable speed cooling device (e.g., cooling device 890 shown in FIG. 8).

Figure 2:
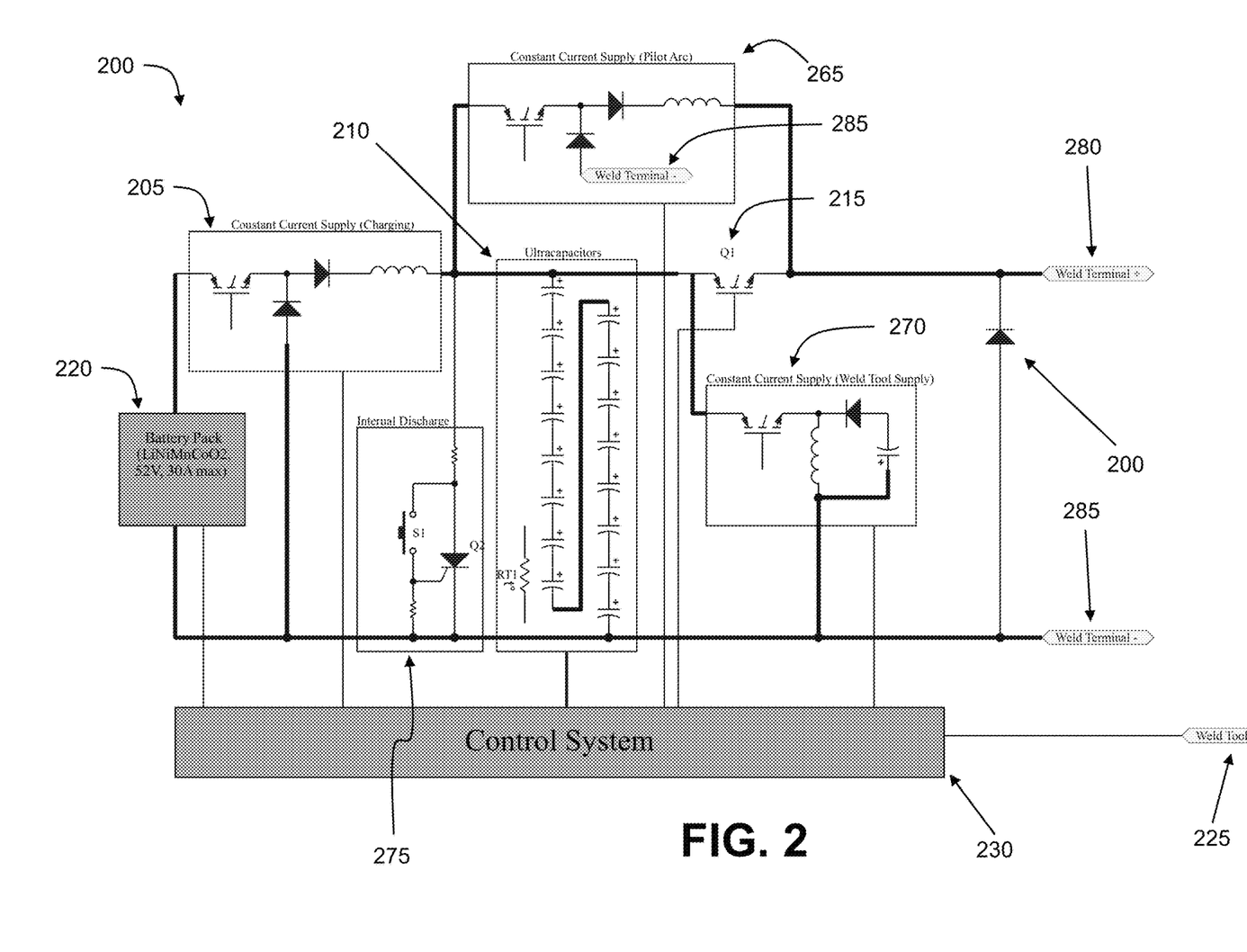
FIG. 2 is a schematic diagram of a drawn arc welding device illustrated in accordance with another aspect of the present disclosure.
Figure 8:
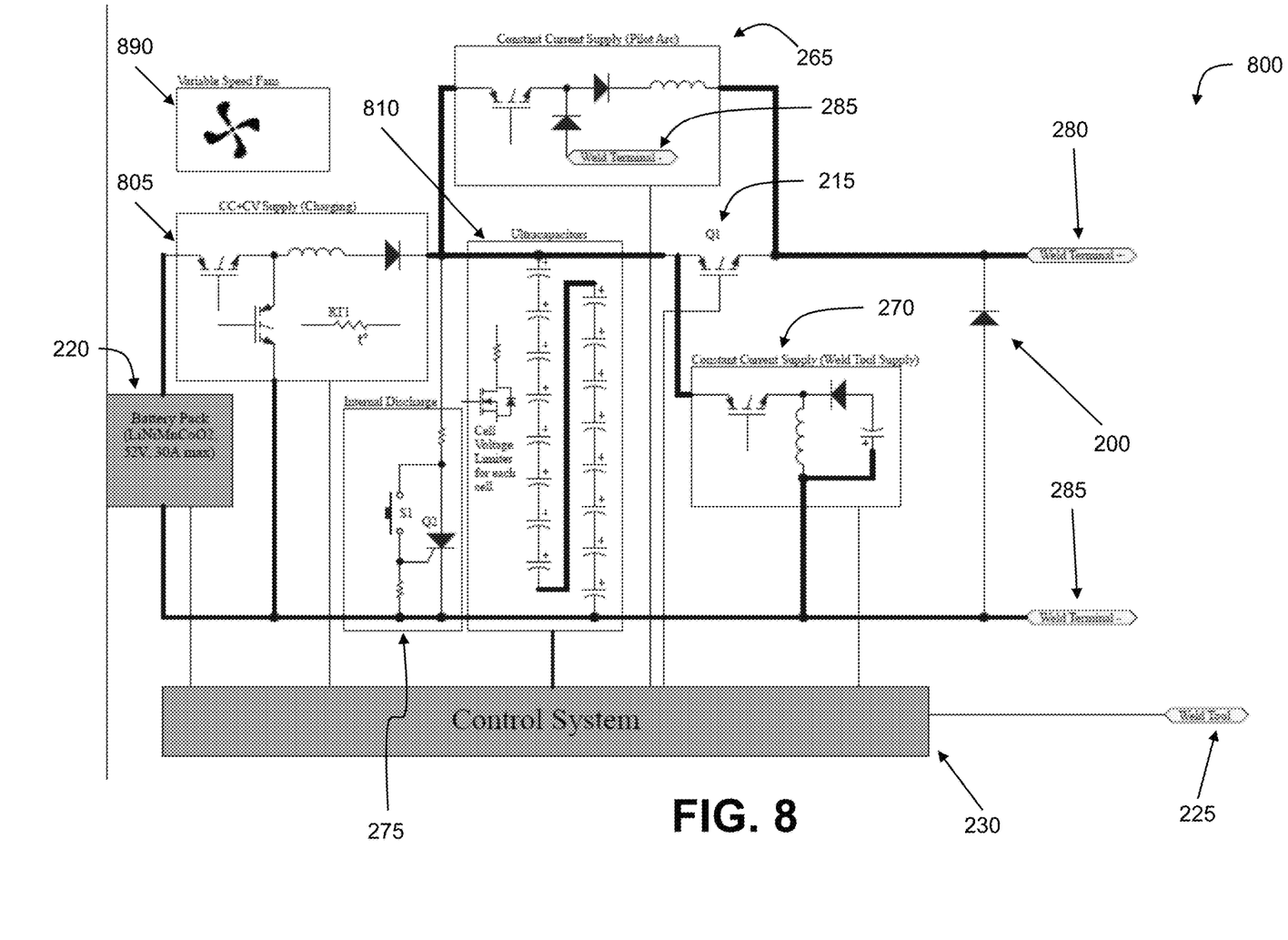
FIG. 8 is a schematic diagram of a drawn arc welding device illustrated in accordance with a third aspect of the present disclosure.

With reference to FIG. 2 and FIG. 8, schematics of a drawn arc stud welding system 200, 800 are illustrated in accordance with a second and third embodiment of the present disclosure. Here, the drawn arc stud welding system 200, 800 includes: (i) a charging circuit 205, 805; (ii) an energy storage device 210, 810; (iii) a discharge circuit 215; (iv) a pilot arc circuit 265; (v) a constant current supply circuit 270; and (vi) an internal discharge circuit 275. As illustrated, the system 200 can also include an external power supply 220, such as a battery pack, a control system 230, and/or a cooling apparatus, such as a variable speed fan 890. The system 200 may further include a welding tool 225, such as a stud gun, having a positive terminal 280 and a negative terminal 285.

As seen in FIGS. 2 and 8, the charging circuit 205, 805 can be operatively connected to the external power supply 220 and the energy storage device 210, 810; the energy storage device 210 can be operatively connected to the charging circuit 205, 805 and the discharge circuit 215; and the discharge circuit 215 can be operatively connected to the energy storage device 210, 810 and the drawn arc stud welding tool 225, for example, via the negative terminal 285. Further, the pilot arc circuit 265 can be operatively connected to the charging circuit 205, 805. The constant current supply circuit 270 can be operatively connected to the energy storage device 210, 810 and the weld tool 225 (e.g., via terminal 285). And the internal discharge circuit 275 can be operatively connected to the energy storage device 210, 810 and the weld tool 225 (e.g., via terminal 285).

In particular embodiments, the system 200 can include a control system 230, which may be operatively connected to one or more of: the charging circuit 205; the energy storage device 210; the discharge circuit 215; the power supply 220; the pilot arc circuit 265; the constant current supply circuit 270; the weld tool 225; and/or a variable speed cooling device (e.g., cooling device 890 shown in FIG. 8).

The discharge circuit 215 can be, for example, a chopper constant-current discharge circuit configured to deliver up to about 2000 ADC for a period of time (i.e., during a welding operation). The discharge circuit 215 can include at least a transistor to regulate a constant discharge current, which may be operatively connected to the control system 230.

In certain embodiments, the power supply 220 may be a battery pack (i.e., a plurality of cells), such as a lithium-ion battery pack. In some embodiments, the power supply 220 may be a lithium nickel manganese cobalt oxide (LiNiMnCoO$_2$) battery pack. The power supply 220 may have a voltage of at least 50V, or about 52V. The power supply 220 may have a bus voltage of about 48 VDC. In specific embodiments, the power supply 220 should be capable of provided the energy storage device 210 with between about 20 and about 30 amps between weld operations. In specific embodiments, the power supply 220 is a 20-30 A at 52V power supply. In further specific embodiments, the power supply 220 is not a LiFePO$_4$ power supply.

Figure 3:
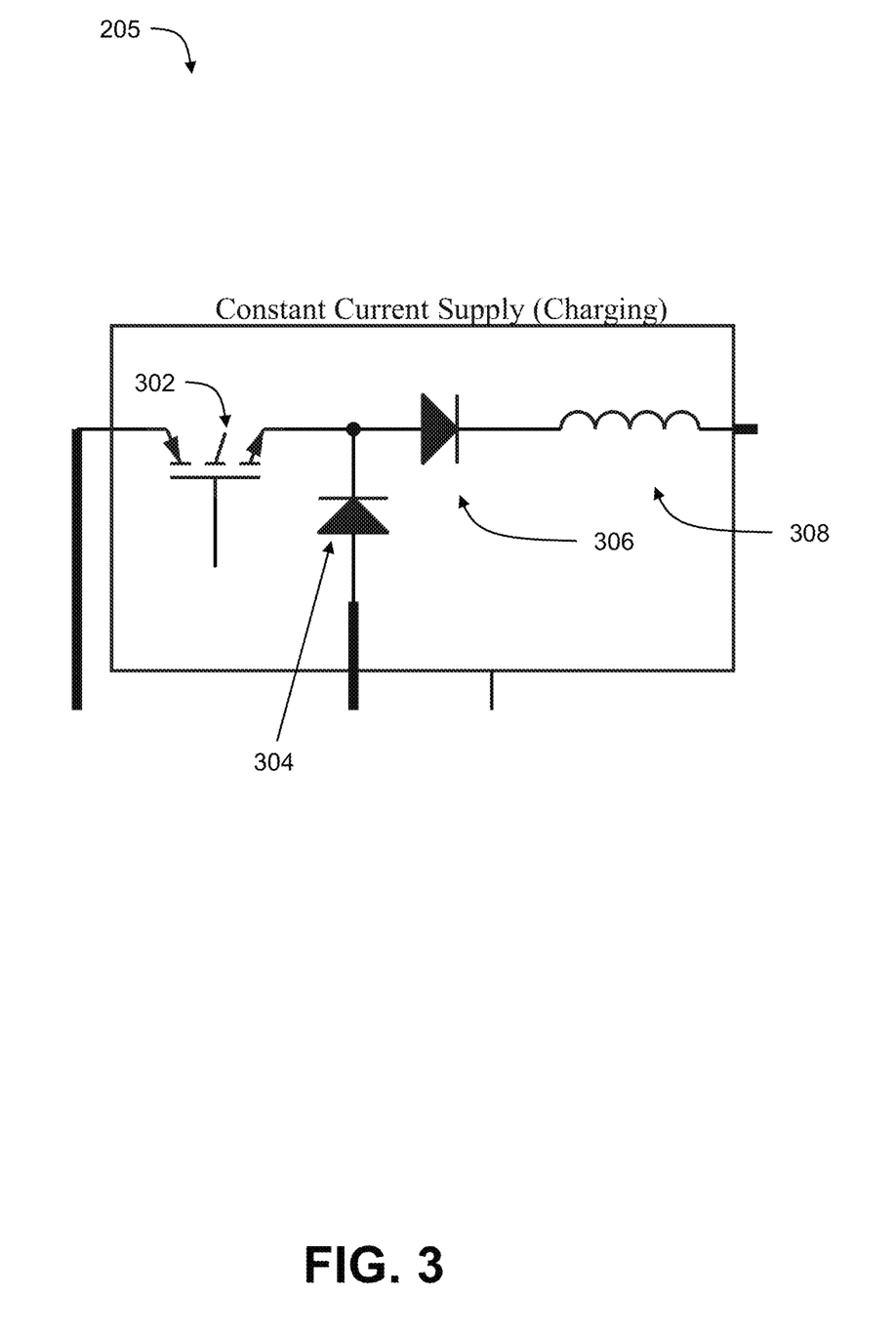
FIG. 3 is a first enlarged portion of the schematic diagram of a drawn arc welding device illustrated in accordance with one aspect of the present disclosure.

The charging circuit 205, 805 may be a synchronous constant-current constant-voltage buck switching supply configured to regulate the charging of the energy storage device 210, 810. In some embodiments, the charging circuit 205, 805 has a switching frequency of at least 150 kHz, or about 150 kHz. As shown in FIG. 3, the charging circuit 205 can comprise a transistor 302, two rectifier diodes 304, 306, and an inductor 308. In further embodiments, such as those illustrated in FIG. 9, the charging circuit 805 can comprise two transistors 902, 904, a rectifier diode 906, a thermal sensor 909, and an inductor 908.

Figure 9:
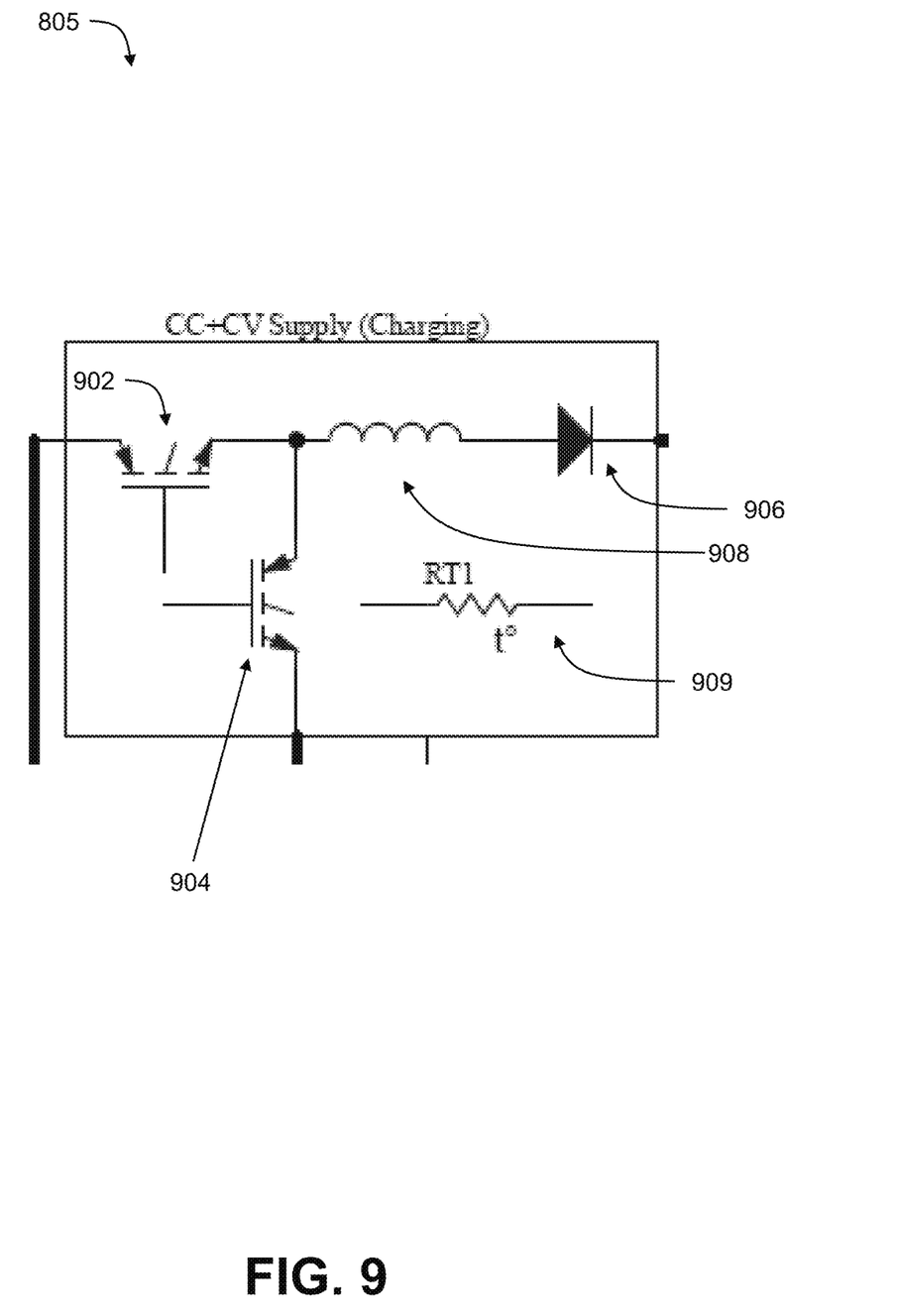
FIG. 9 is a first enlarged portion of the schematic diagram of a drawn arc welding device illustrated in accordance with one aspect of the present disclosure.

In particular embodiments, one or more temperature sensors 309 of the charging circuit 205 are operatively connected to the control system 230. These temperature sensors 909 can be used by the control system 230 to monitor the temperature of the charging circuit 805 and control the variable speed fans 890.

Figure 4:
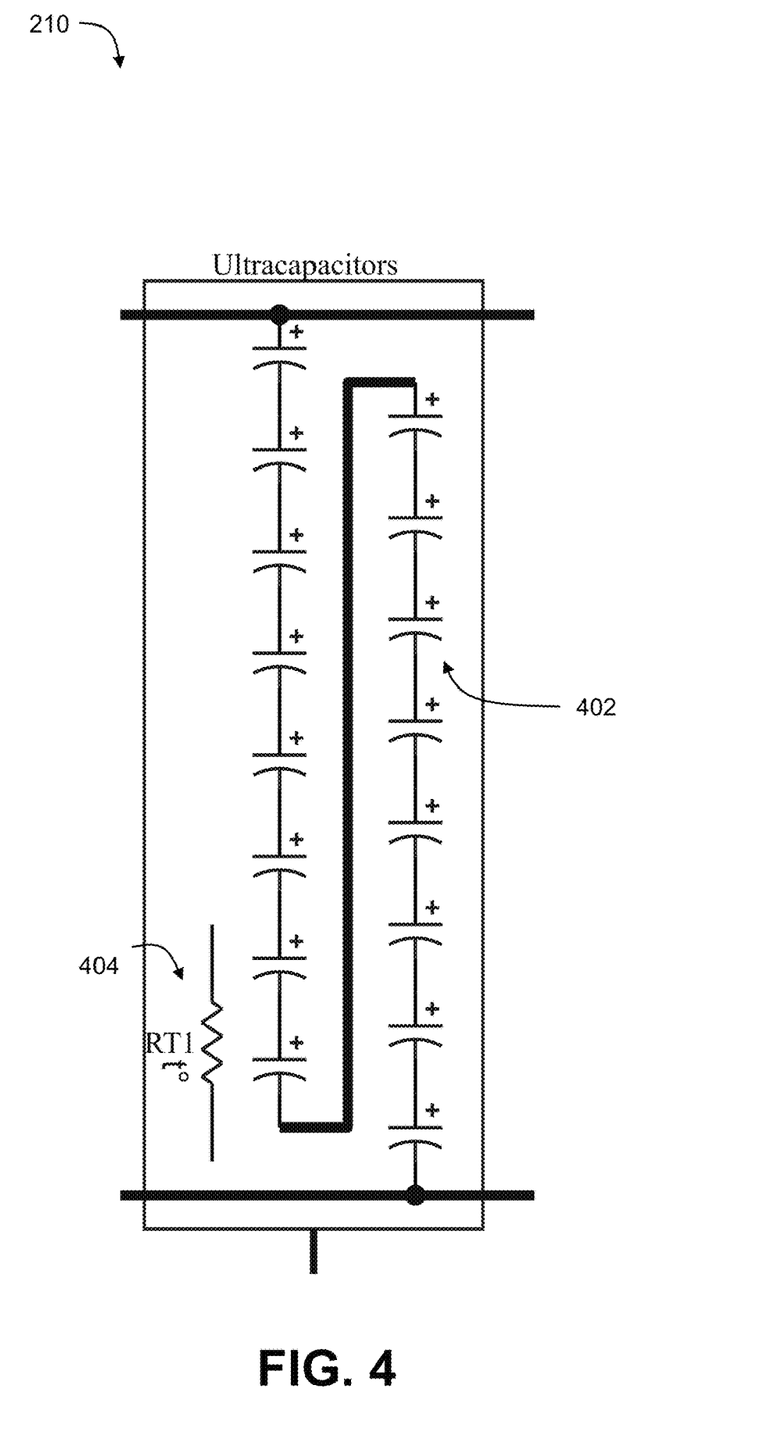
FIG. 4 is a second enlarged portion of the schematic diagram of a drawn arc welding device illustrated in accordance with one aspect of the present disclosure.
Figure 10:
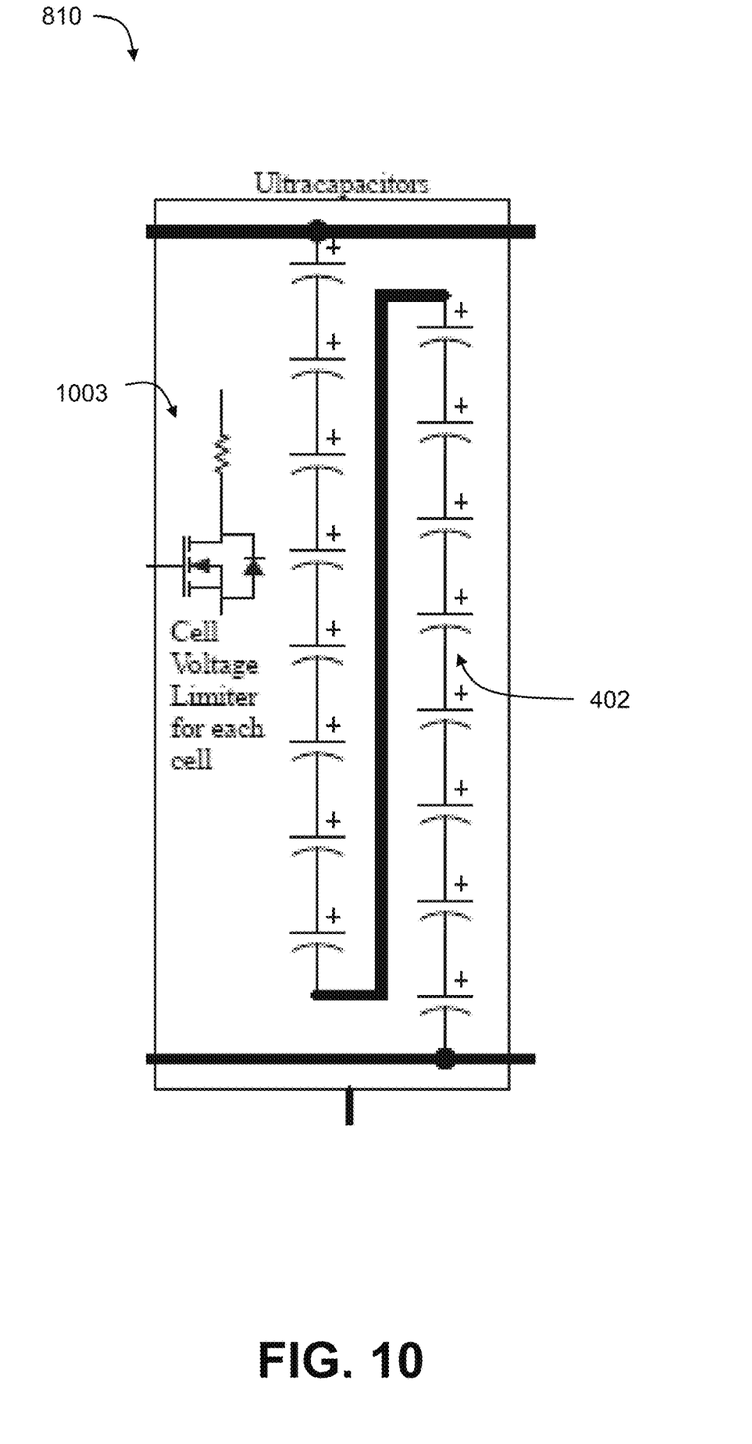
FIG. 10 is a second enlarged portion of the schematic diagram of a drawn arc welding device illustrated in accordance with one aspect of the present disclosure.

Turning to FIGS. 4 and 10, the energy storage device 210, 810 may comprise a plurality of capacitors 402, including at least about 10 capacitors 402, or between about 10 and about 20 capacitors, or about 16 capacitors 402. Each of the capacitors 402 may be operatively connected in series. In certain embodiments, the capacitors 402 may be polarized capacitors 402 and/or low equivalent series resistance ("ESR") capacitors 402. In further embodiments, each of these capacitors 402 may be an ultracapacitor, such as a 3.0V ultracapacitor cell. As described above, these capacitors 402 may be configured to store sufficient energy to support at least one drawn arc stud welding operation. For example, the energy storage device 210, 810 may store at least about 100 KJ of energy, or at least about 200 kJ, or between about 100 kJ to about 300 KJ, or about 200 kJ, or about 215 kJ. Accordingly, the energy storage devices 210, 810 of the present disclosure are capable of providing a high-power pulse needed for a stud weld operation.

In some embodiments, the energy storage device 210 may further comprise one or more temperature sensors 404 operatively connected to the control system 230, as shown in FIG. 4. These temperature sensors 404 may be used by the control system 230 to monitor the temperature of ultracapacitor cells 402. In further embodiments, each ultracapacitor 402 may include a voltage limiter circuit 1003 as shown in FIG. 10. These voltage limit circuits 1003 can be used to monitor and limit voltage by draining energy as required.

Figure 5:
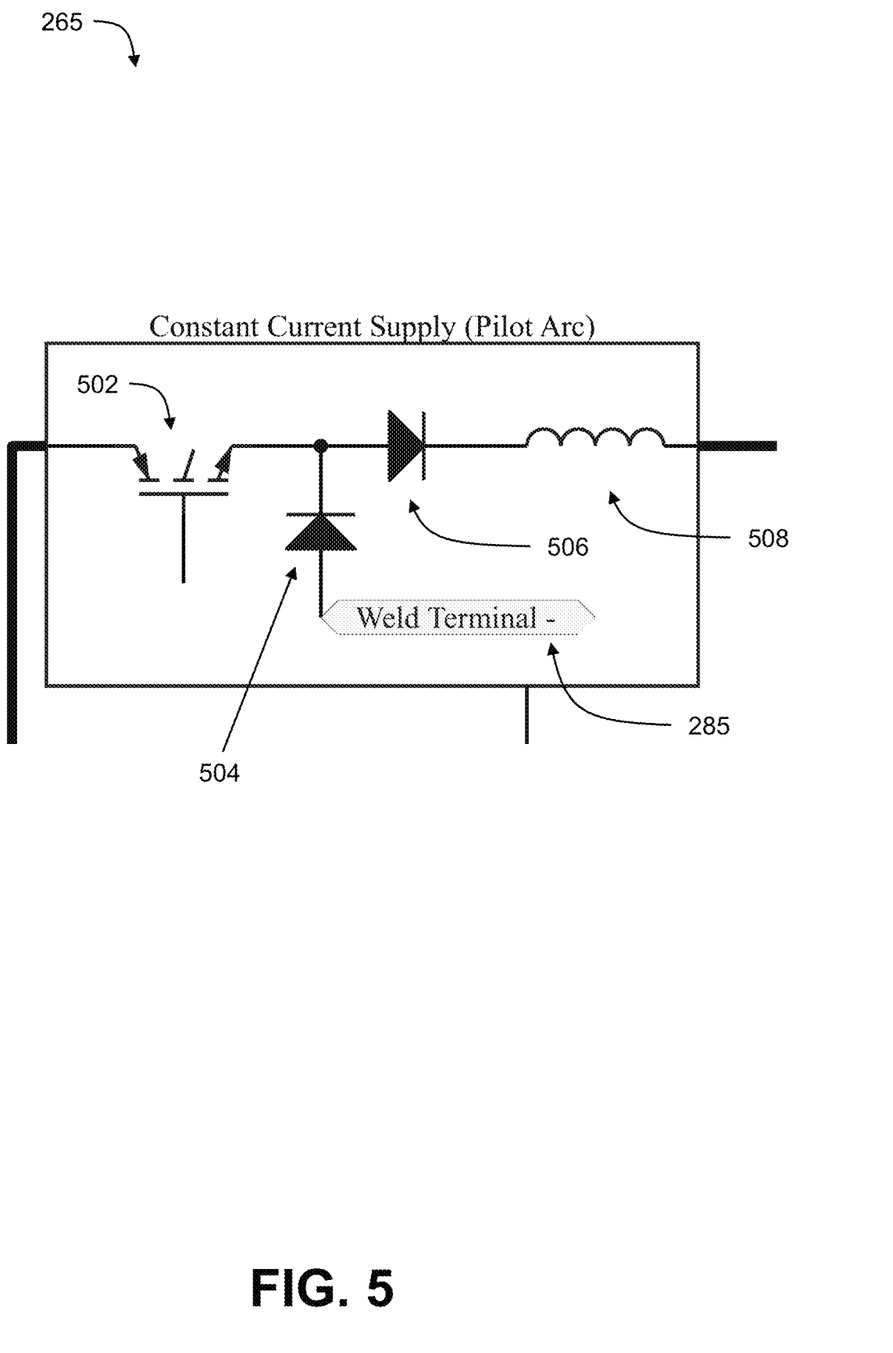
FIG. 5 is a third enlarged portion of the schematic diagram of a drawn arc welding device illustrated in accordance with one aspect of the present disclosure.

Turning to FIG. 5, the pilot arc circuit 265 may be a chopper constant-current switching supply configured to deliver a pilot arc via the weld tool 225, 285. In some embodiments, the pilot arc circuit 265 has a switching frequency of at least 150 kHz, or about 150 KHz. As seen in FIG. 5, the pilot arc circuit 265 may include a transistor 502, one or more rectifier diodes 504, 506, and an inductor 508. Further, the pilot arc circuit 265 may be operatively connected to the weld tool 225, for example, via the negative terminal 285 of the weld tool 225.

In certain embodiments, the system 200, 800 includes an internal discharge circuit 275, which can be configured to dissipate energy from the ultracapacitors when service of the system 200, 800 is required.

Figure 6:
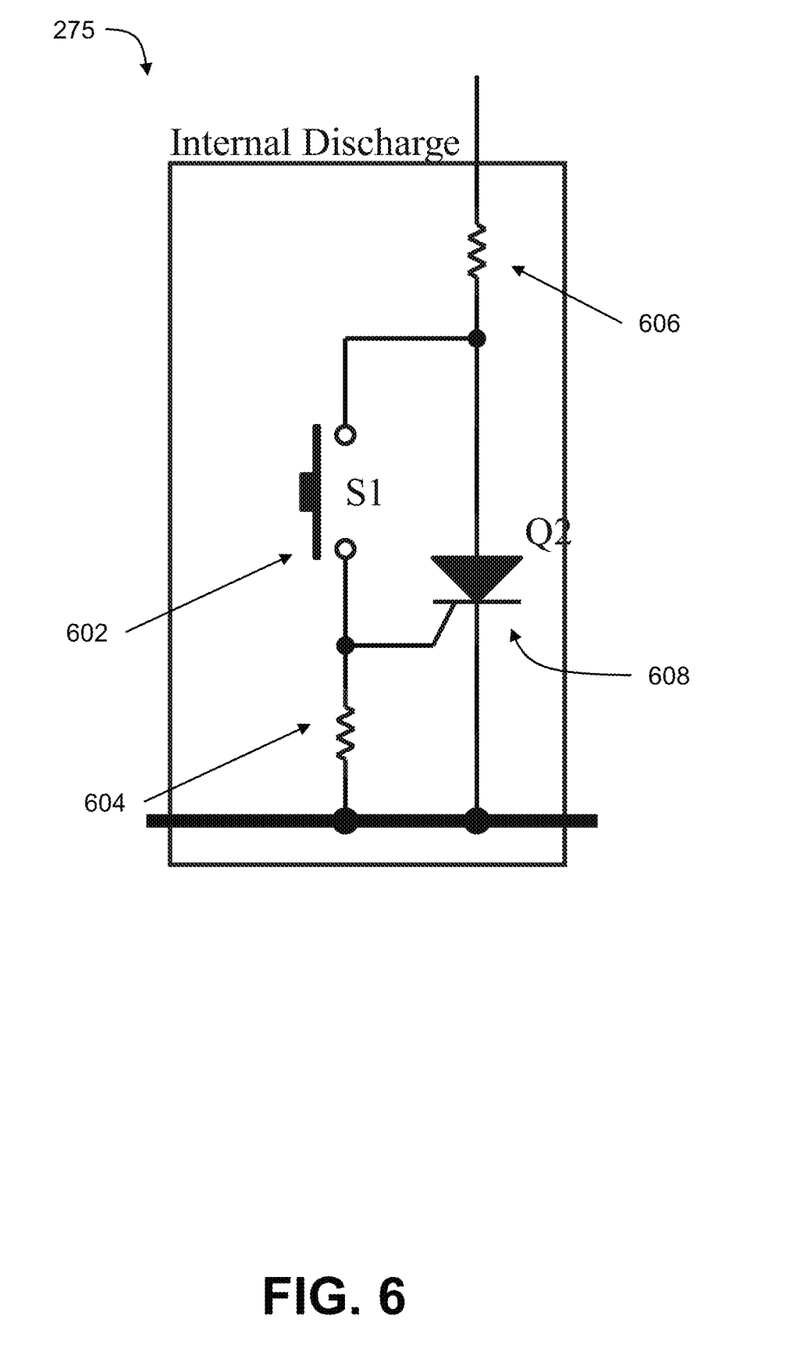
FIG. 6 is a fourth enlarged portion of the schematic diagram of a drawn arc welding device illustrated in accordance with one aspect of the present disclosure.

As shown in FIG. 6, the system 200, 800 can include an internal discharge circuit 275 configured to reduce the energy stored in the energy storage device 210, 810 to zero or about zero. The internal discharge circuit 275 may include a push-button switch 602, one or more resistors 604, 606, and a rectifier diode 608. In particular embodiments, the rectifier 608 can be a silicon-controlled rectifier ("SCR"), which blocks until the "gate" is fired, after which it will conduct current in the forward direction like a standard diode until current reaches a low threshold value, after which it will block again.

Figure 7:
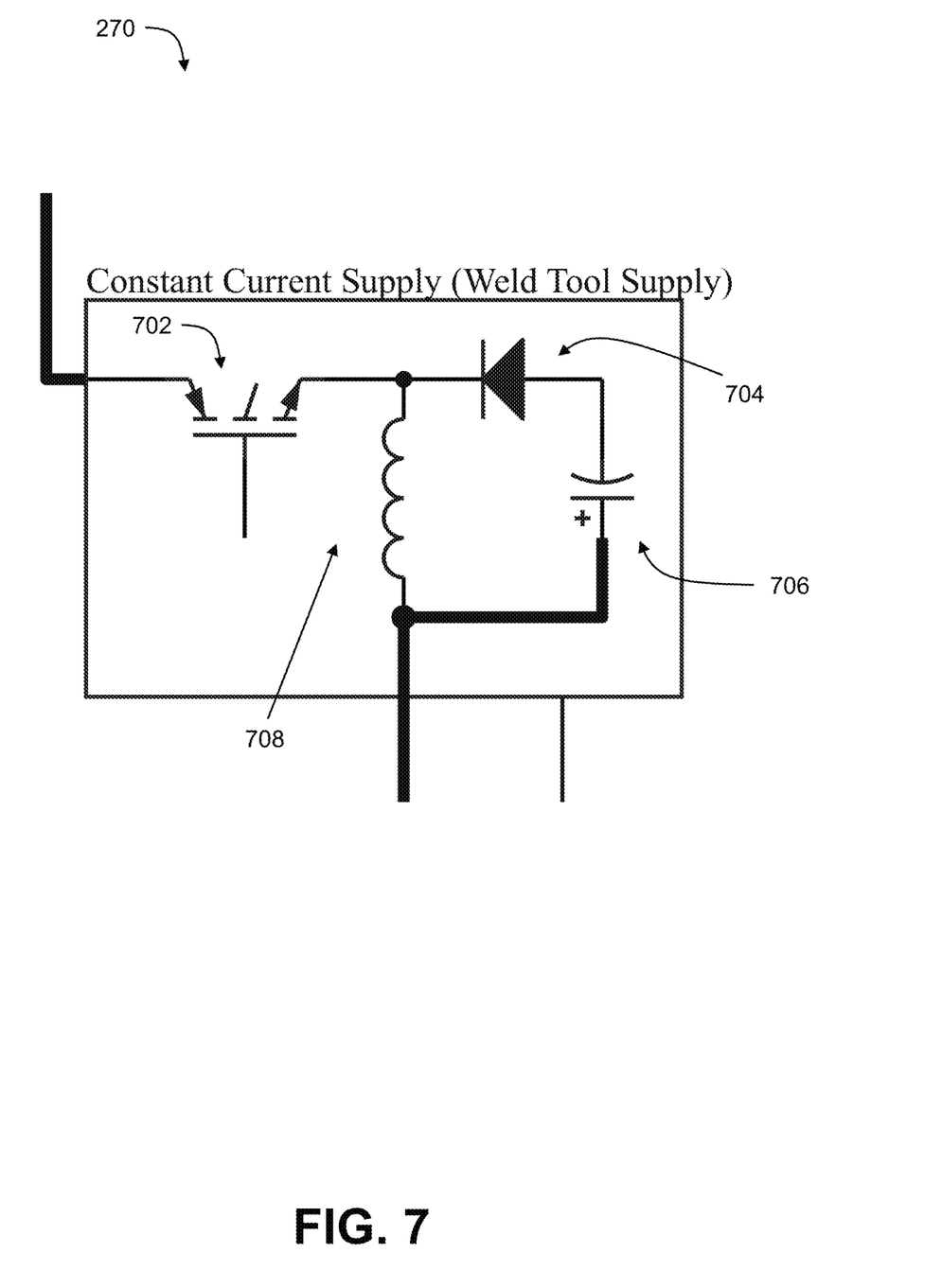
FIG. 7 is a fifth enlarged portion of the schematic diagram of a drawn arc welding device illustrated in accordance with one aspect of the present disclosure.

Turning to FIG. 7, the system 200, 800 can include a separate constant current supply circuit 270. The constant current supply circuit 270 may be configured to separately provide energy to the weld tool 225. For example, in particular embodiments, the constant current supply circuit 270 may be configured to drive the operation of a solenoid (not shown) of the weld tool 225. The solenoid of the weld tool 225 is used to control the position of the stud/fastener that is to be welded to the parent metal. In some embodiments, the constant current supply circuit 270 may be a buck-boost supply configured to charge a separate capacitor to about 100 VDC for driving the weld tool solenoid. As illustrated in FIG. 7, the constant current supply circuit 270 can include a transistor 702, a rectifier diode 704, a capacitor 706, and an inductor 708.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A drawn arc fastener welding system comprising:
   a charging circuit operatively connected to an external power supply and configured to generate a charging current; wherein said external power supply comprises a LiNiMnCoO2 battery pack having a voltage of about 52V and providing a current of between about 20 amps to about 30 amps;
   an energy storage device operatively connected to the charging circuit, wherein the energy storage device is configured to receive the charging current and to store a first amount of energy for supporting at least one drawn arc stud welding operation, wherein the energy storage device comprises a plurality of ultracapacitors in series and the energy storage device stores at least about 100 kJ of energy; and
   a discharge circuit operatively connected to the energy storage device, wherein the discharge circuit is configured to receive an output current from the energy storage device and communicate a discharge current to a drawn arc stud welding tool for a first time duration.

2. The drawn arc fastener welding system of claim 1, wherein the system further comprises the drawn arc stud welding tool, the welding tool being configured to receive one or more welding fasteners and being operatively connected to at least the discharge circuit.

3. The drawn arc fastener welding system of claim 2, wherein the system further includes:
   a control system operatively connected to one or more of: the external power supply; the charging circuit; the energy storage device; the discharge circuit; and the drawn arc stud welding tool;
   wherein the control system comprises:
     at least one processor;
     a memory configured to store instructions to be executed by the at least one processor; and
     a user interface configured to enable multiple user-selectable modes of operation for the drawn arc fastener welding system.

4. The drawn arc fastener welding system of claim 3, wherein the system further comprises the external power supply.

5. The drawn arc fastener welding system of claim 1, wherein each ultracapacitor of the plurality of ultracapacitors is a low equivalent series resistance (ESR) ultracapacitor.

6. The drawn arc fastener welding system of claim 1, wherein each ultracapacitor of the plurality of ultracapacitors includes a voltage limiting device.

7. The drawn arc fastener welding system of claim 1, wherein the charging circuit is a synchronous constant-current constant-voltage buck switching supply circuit configured to regulate the charging of the energy storage device.

8. The drawn arc fastener welding system of claim 1, wherein the discharge circuit is a chopper constant-current discharge circuit configured to communicate the discharge current to the drawn arc stud welding tool for the first time duration.

9. The drawn arc fastener welding system of claim 1, wherein the discharge current communicated to the drawn arc stud welding tool is up to 2000 ADC.

10. A drawn arc stud welding system comprising:
    a charging circuit operatively connected to an external power supply comprising a lithium battery having a voltage of about 52V and current of between about 20 amps and about 30 amps; and configured to generate a charging current;
    an energy storage device operatively connected to the charging circuit, wherein the energy storage device is configured to receive the charging current and store a first amount of energy for supporting at least one drawn arc stud welding operation, wherein the energy storage device comprises a plurality of ultracapacitors in series, and the energy storage device stores at least about 200 kJ of energy;
    a discharge circuit operatively connected to the energy storage device, wherein the discharge circuit is configured to receive an output current from the energy storage device and communicate a discharge current to a drawn arc stud welding tool for a first time duration;
    a pilot arc circuit operatively connected to the charging circuit and configured to deliver an initial current to the drawn arc stud welding tool to support a pilot arc;
    a constant current supply boost circuit operatively connected to the energy storage device and configured to drive a weld tool solenoid; and
    an internal discharge circuit operatively connected to the energy storage device.

11. The drawn arc stud welding system of claim 10, wherein the system further comprises a control system operatively connected to at least one of: the external power supply; the charging circuit; the energy storage device; the discharge circuit; the pilot arc circuit; and the constant current supply circuit;
    wherein the control system comprises:
      at least one processor;
      a memory configured to store instructions to be executed by the at least one processor; and
      a user interface configured to enable multiple user-selectable modes of operation for the drawn arc fastener welding system.

12. The drawn arc fastener welding system of claim 10, wherein the system further comprises a cooling apparatus operatively connected to the control system.

13. The drawn arc fastener welding system of claim 12, wherein the system further comprises one or more temperature sensors associated with the charging circuit and operatively connected to the control system.

14. The drawn arc fastener welding system of claim 13, wherein the memory of the control system includes instructions for:
- receiving at least one temperature measurement from the one or more temperature sensors associated with the charging circuit; and
- adjusting the performance of the cooling apparatus based on the at least one temperature measurement received from the one or more temperature sensors associated with the charging circuit, wherein adjusting the performance of the cooling apparatus causes the charging circuit to change temperature.

* * * * *